(12) United States Patent
Hsu et al.

(10) Patent No.: US 6,963,326 B2
(45) Date of Patent: Nov. 8, 2005

(54) FREQUENCY SWITCHING METHOD OF A CPU

(75) Inventors: Shih-Ming Hsu, Shindian (TW); Tzu-Yung Hsu, Shindian (TW); Chi-Feng Lee, Shindian (TW); Shih-Chuan Hsu, Shindian (TW); Tsung-Pao Kuan, Shindian (TW); Yi-Chou Chen, Shindian (TW)

(73) Assignee: High Tech Computer Corp., Taoyuan (TW)

( * ) Notice: Subject to any disclaimer, the term of this patent is extended or adjusted under 35 U.S.C. 154(b) by 349 days.

(21) Appl. No.: 10/461,553

(22) Filed: Jun. 12, 2003

(65) Prior Publication Data

US 2004/0051708 A1 Mar. 18, 2004

(30) Foreign Application Priority Data

Sep. 13, 2002 (TW) ............................... 91121081 A

(51) Int. Cl.⁷ ............................................. G09G 3/36
(52) U.S. Cl. ........................... 345/99; 345/94; 345/204
(58) Field of Search ............................. 345/87, 94, 99, 345/204, 208

(56) References Cited

U.S. PATENT DOCUMENTS

| | | | | |
|---|---|---|---|---|
| 4,682,289 A | * | 7/1987 | Nishihara | 378/14 |
| 5,991,883 A | * | 11/1999 | Atkinson | 713/300 |
| 6,476,800 B2 | * | 11/2002 | Millman et al. | 345/212 |
| 2003/0011547 A1 | * | 1/2003 | Igarashi et al. | 345/87 |

* cited by examiner

*Primary Examiner*—Ricardo Osorio
(74) *Attorney, Agent, or Firm*—Thomas, Kayden, Horstemeyer & Risley

(57) ABSTRACT

The invention is a frequency switching method of a CPU in electronic devices. The electronic device is comprised of a display screen and the CPU. The screen display changes according to the pixel clock. The method lowers the frequency of the pixel clock, switching the CPU frequency, and then restores the frequency of the pixel clock.

7 Claims, 1 Drawing Sheet

FREQUENCY SWITCHING METHOD OF A CPU

This application claims the benefit of Taiwan application Serial No.91121081, filed Sep. 13, 2002.

BACKGROUND OF THE INVENTION

1. Field of the Invention

The invention relates in general to a frequency switching method of a CPU, and more particularly to a frequency switching method of an Intel® XScale™ CPU.

2. Description of the Related Art

The Central Processing Unit (CPU) of Intel® XScale™ Microarchitecture, for example, the PXA250 or PXA210 CPU, has the advantages of ultra-low power consumption, minute volume, and is highly integrated. It is suitable for embedded systems as well as portable devices, such as a personal digital assistant (PDA). Taking the PXA250 CPU as an example, it has three operational modes: Turbo, Run, and Idle. During the Turbo mode, the operational frequency of the PXA250 CPU can reach a maximum of 400 MHz; during the Run mode, the operational frequency has a minimum of 100 MHz. Using a PDA as an example, when the user doesn't operate it for a period of time, it automatically switches to Idle mode in order to reduce power consumption. This switch can occur even though the LCD screen is on, for example, while reading an electronic book. When the PXA250 CPU is switched from the highest frequency in Turbo mode to Idle mode, the PXA250 CPU consumes about 110 mA at the Idle mode; when the PXA250 CPU is switched from the lowest frequency of Run mode to Idle mode, the PXA250 CPU consumes only about 70 mA at Idle mode. There is a 36 percent power consumption difference between these two types of switch, therefore the power consumption can be reduced if the PXA250 CPU first switched from Turbo mode to the lowest frequency of Run mode and then switched to Idle mode.

FIG. 1 is the flow chart of the conventional frequency switching method of a PXA250 CPU in a PDA. When the PDA needs to enter a power-saving state, the PXA250 CPU is switched to Run mode with a 100 MHz frequency (step 110). Then the PXA250 CPU is switched to Idle mode (step 120). Step 110 and 120 assure the minimum power consumption of the PDA. When the Idle mode is terminated, such as an interrupt occurs, the PXA250 CPU is switched to the original mode, for example Turbo mode with a 400 MHz frequency (step 130) for the best performance.

However, an abnormal disturbance, which is called a glitch, occurs on the PDA's screen during the frequency switching in step 110 or 130. In Run mode with a 100 MHz frequency, the internal bus, PXBus, of PXA250 CPU operates on 50 MHz frequency, while in Turbo mode with 400 HMz frequency, the internal bus operates on 100 MHz frequency. Due to the frequency switching of the internal bus, the PLL (phase lock loop) of the PXA250 CPU is disabled and then the pixel clock stops, which result in the glitch on the screen.

SUMMARY OF THE INVENTION

It is therefore an object of the invention to provide a frequency switching method of a CPU to prevent the glitch on the screen.

The invention achieves the above-identified objective by providing a method of lowering the frequency of the pixel clock, switching the CPU's operation frequency, and then restoring the frequency of the pixel clock.

Other objects, features, and advantages of the invention will become apparent from the following detailed description of the preferred but non-limiting embodiments. The following description is made with reference to the accompanying drawings.

DETAILED DESCRIPTION OF THE INVENTION

The glitch occurs on the screen because the PLL (phase lock loop) is disabled during the frequency switching of the CPU. The PLL is disabled for a period of approximately 335 μs for every frequency switching of the internal bus in PXA250 CPU. The frame buffer of PXA250 CPU is 128 bytes in size and has a pixel rate of 4.54 MHz during normal operation. The frame buffer can therefore maintain a normal display time of $(128/2)*(1/4.54 \text{ MHz})=14.1$ μs. Due to the fact that 14.1 μs is much smaller than the disabled period of 335 μs, the display on the LCD becomes abnormal after the data in the frame buffer is used up after 14.1 μs.

The invention lows the pixel clock under 191 KHz before the frequency switching, and then the normal display time of the frame buffer is larger than the PLL disabled period, 355 μs. Therefore, the glitch on the screen is avoided. The pixel clock is restored to its normal frequency after the completion of the frequency switching.

Figure 1:
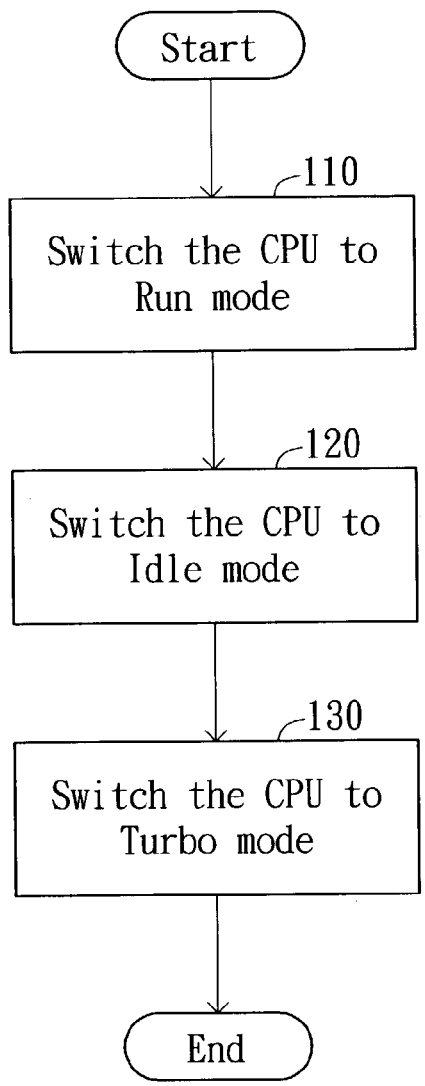
FIG. 1 is the flow chart of the conventional frequency switching method of a PXA250 CPU in a PDA.
Figure 2:
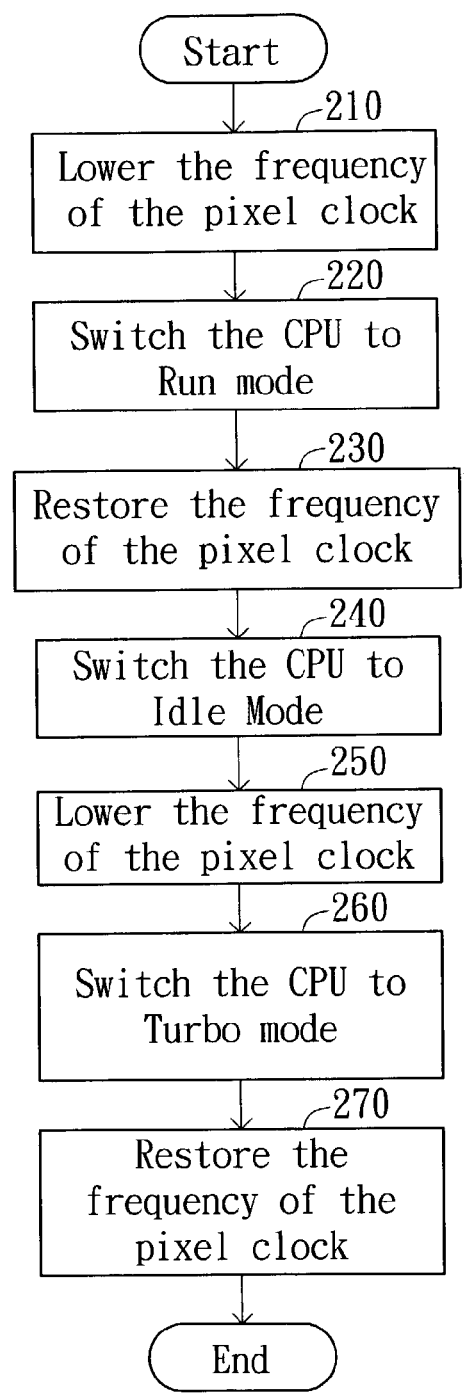
FIG. 2 is a flow chart of the frequency switching method of a CPU according to a preferred embodiment of the invention.

FIG. 2 is a flow chart of the frequency switching method of a CPU according to a preferred embodiment of the invention. This embodiment takes the PXA250 CPU as an example. The method is executed if the PXA250 CPU would enter Idle mode. First, the PXA250 CPU is switched into Run mode, as shown in steps 210 to 230. In step 210, the frequency of the pixel clock is lowered; in this example, it is lowered to 191 KHz. In step 220, the PXA250 CPU enters Run mode with 100 MHz frequency. In step 230, the pixel clock is restored back to its normal rate of 4.45 MHz. In step 240, the PXA250 CPU enters Idle mode for minimum power consumption. When Idle mode is terminated, the CPU's frequency is restored back to the original operation frequency, as in steps 250 to 270. In step 250, the frequency of the pixel clock is lowered to 191 KHz. In step 260, the PXA250 CPU enters Turbo mode with the 400 MHz frequency. In step 270, the frequency of the pixel clock is restored back to 4.54 MHz in this embodiment.

The frequency switching method of the CPU lowers the pixel clock before the frequency switching, and restores the pixel clock upon the completion of the frequency switching. Therefore, the glitch on the screen is avoided.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency switching method for switching the operation frequency of a CPU in an electronic device from a first frequency to a second frequency, the electronic device including a display screen and the CPU, the display screen displaying an image according to a pixel clock, the method comprising:

switching the frequency of the pixel clock from a third frequency to a fourth frequency;

switching the operation frequency of the CPU from the first frequency to the second frequency; and restoring the frequency of the pixel clock from the fourth frequency to the third frequency.

2. The method according to claim 1, wherein the pixel clock is controlled by an internal bus in the CPU.

3. The method according to claim 1, wherein the second frequency is smaller than the first frequency.

4. The method according to claim 1, wherein the fourth frequency is smaller than the third frequency.

5. The method according to claim 1, wherein at the operation frequency switching step, a phase lock loop (PLL) of the CPU is disabled.

6. The method according to claim 1, wherein the electronic device is personal digital assistant (PDA).

7. The method according to claim 1, wherein the display screen is a liquid crystal display (LCD).

* * * * *